(12) United States Patent
Ojala et al.

(10) Patent No.: US 9,001,747 B2
(45) Date of Patent: Apr. 7, 2015

(54) REPORTING CHANNEL STATE INFORMATION

(75) Inventors: Jussi Kustaa Ojala, Helsinki (FI); Timo Erkki Lunttila, Espoo (FI)

(73) Assignee: Nokia Corporation, Espoo (FI)

( * ) Notice: Subject to any disclaimer, the term of this patent is extended or adjusted under 35 U.S.C. 154(b) by 389 days.

(21) Appl. No.: 12/934,900

(22) PCT Filed: Mar. 26, 2009

(86) PCT No.: PCT/IB2009/051275
§ 371 (c)(1),
(2), (4) Date: Sep. 27, 2010

(87) PCT Pub. No.: WO2009/118707
PCT Pub. Date: Oct. 1, 2009

(65) Prior Publication Data
US 2011/0019637 A1     Jan. 27, 2011

Related U.S. Application Data

(60) Provisional application No. 61/039,609, filed on Mar. 26, 2008.

(51) Int. Cl.
| H04W 4/00 | (2009.01) |
| H04W 24/10 | (2009.01) |
| H04L 1/00 | (2006.01) |
| H04W 28/18 | (2009.01) |
| H04W 72/04 | (2009.01) |

(52) U.S. Cl.
CPC ............. *H04W 24/10* (2013.01); *H04L 1/0026* (2013.01); *H04L 1/0027* (2013.01); *H04L 1/0059* (2013.01); *H04W 28/18* (2013.01); *H04W 72/042* (2013.01)

(58) Field of Classification Search
USPC .......................................................... 370/329
See application file for complete search history.

(56) References Cited

U.S. PATENT DOCUMENTS

| 5,768,276 | A | * | 6/1998 | Diachina et al. | ............... 370/432 |
| 2003/0045274 | A1 | * | 3/2003 | Nishitani | ....................... 455/414 |
| 2005/0007456 | A1 | * | 1/2005 | Lee et al. | ................. 348/207.99 |
| 2007/0287476 | A1 | * | 12/2007 | Jeong et al. | ................ 455/456.6 |
| 2008/0165697 | A1 | * | 7/2008 | Zeira et al. | ..................... 370/252 |
| 2009/0130985 | A1 | * | 5/2009 | Lee et al. | .................. 455/67.11 |
| 2009/0130986 | A1 | * | 5/2009 | Yun et al. | ................... 455/67.11 |
| 2010/0220618 | A1 | * | 9/2010 | Kwon et al. | .................. 370/252 |

* cited by examiner

*Primary Examiner* — Huy D Vu
*Assistant Examiner* — Kevin Cunningham
(74) *Attorney, Agent, or Firm* — Squire Patton Boggs (US) LLP

(57) ABSTRACT

An approach is provided for reporting channel state information. The network configures parameters relating to periodic reporting of channel state information and generates a resource allocation message including a flag to enable or disable the reporting of channel state information in a subframe configured for periodic reporting.

18 Claims, 13 Drawing Sheets

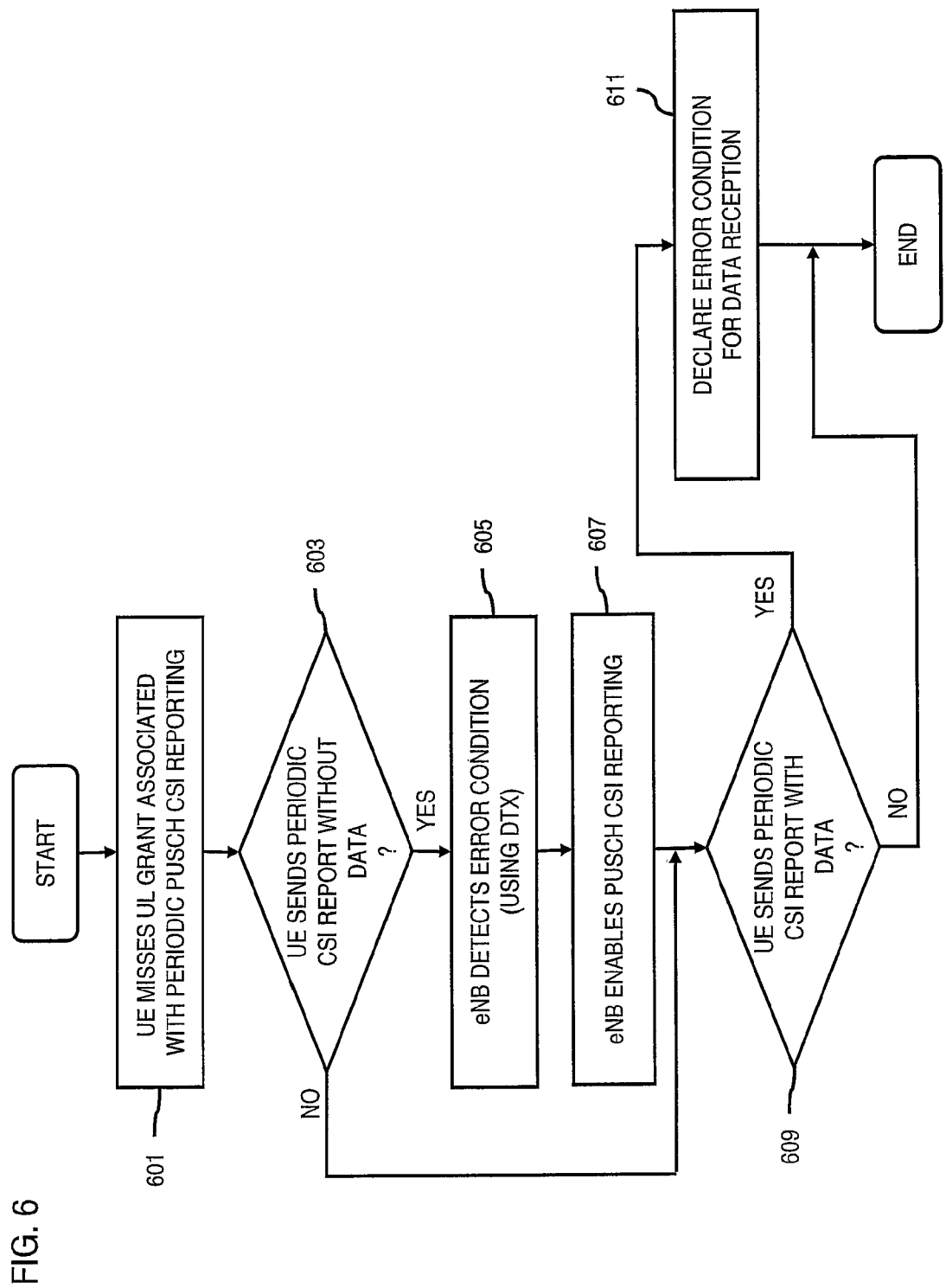

REPORTING CHANNEL STATE INFORMATION

RELATED APPLICATION

This application was originally filed as PCT Application No. PCT/IB2009/051275 and claims priority to U.S. Provisional Application No. 61/039,609 filed on Mar. 26, 2008, which is incorporated herein by reference in its entirety.

BACKGROUND

Radio communication systems, such as a wireless data networks (e.g., Third Generation Partnership Project (3GPP) Long Term Evolution (LTE) and Long Term Evolution-Advanced (LTE-Advanced) systems, spread spectrum systems (such as Code Division Multiple Access (CDMA) networks), Time Division Multiple Access (TDMA) networks, Orthogonal Frequency Division Multiplexed (OFDMA) networks, spatially multiplexed networks, WiMAX (Worldwide Interoperability for Microwave Access), etc.), provide users with the convenience of mobility along with a rich set of services and features. This convenience has spawned significant adoption by an ever growing number of consumers as an accepted mode of communication for business and personal uses. To promote greater adoption, the telecommunication industry, from manufacturers to service providers, has agreed at great expense and effort to develop standards for communication protocols that underlie the various services and features. One area of interest is the determination and reporting of channel state information. Knowledge of channel state information permits optimization transmission parameters, such as a power requirements, bandwidth allocation, modulation schemes, etc. Traditionally, such channel state information has been exchanged using signaling mechanisms that waste bandwidth (i.e., by incurring unnecessary overhead).

SOME EXEMPLARY EMBODIMENTS

Therefore, there is a need for an approach for providing efficient signaling for conveying channel state information, while ensuring compatibility with already developed standards and protocols.

According to one embodiment, a computer-readable storage medium carrying one or more sequences of one or more instructions which, when executed by one or more processors, cause the one or more processors to configure one or more parameters relating to periodic reporting of channel state information by a user equipment. The one or more processors are also caused to generate a resource allocation message including a flag to enable or disable the reporting of the channel state information in a subframe configured for periodic reporting. The one or more processors are further caused to initiate transmission of the resource allocation message to the user equipment.

According to another embodiment, an apparatus comprising a processor and a memory storing executable instructions that if executed cause the apparatus to configure one or more parameters relating to periodic reporting of channel state information by a user equipment. The processor and the memory are also caused to generate a resource allocation message including a flag to enable or disable the reporting of the channel state information in a subframe configured for periodic reporting. The processor and the memory are further caused to initiate transmission of the resource allocation message to the user equipment.

According to another embodiment, an apparatus comprises means for configuring one or more parameters for periodic reporting of channel state information by a user equipment. The apparatus also comprises means for generating a resource allocation message including a flag to enable or disable the reporting of the channel state information in a subframe configured for periodic reporting. The apparatus further comprises means for initiating transmission of the second resource allocation message to the user equipment.

According to another embodiment, a computer-readable storage medium carrying one or more sequences of one or more instructions which, when executed by one or more processors, cause the one or more processors to receive configuration information, from a base station, for one or more parameters relating to periodic reporting of channel state information in a subframe configured for periodic reporting. The one or more processors are also caused to receive a resource allocation message including a flag to enable or disable the reporting of the channel state information. The one or more processors are further caused to determine the channel state information according to the configuration information in a subframe configured for periodic reporting. The one or more processors are further caused to report the channel state information to the base station according to the flag.

According to another embodiment, an apparatus comprising a processor and a memory storing executable instructions that if executed cause the apparatus to receive configuration information, from a base station, for one or more parameters relating to periodic reporting of channel state information. The processor and the memory are also caused to receive a resource allocation message including a flag to enable or disable the reporting of the channel state information in a subframe configured for periodic reporting. The processor and the memory are further caused to determine the channel state information according to the configuration information. The processor and the memory are further caused to report the channel state information to the base station according to the flag.

According to yet another embodiment, an apparatus comprises means for receiving configuration information, from a base station, for one or more parameters relating to periodic reporting of channel state information. The apparatus also comprises means for receiving a resource allocation message including a flag to enable or disable the reporting of the channel state information in a subframe configured for periodic reporting. The apparatus further comprises means for determining the channel state information according to the configuration information. The apparatus further comprises means for reporting the channel state information to the base station according to the flag.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart of an error handling process associated with channel state information reporting, according to an exemplary embodiment;

DESCRIPTION OF PREFERRED EMBODIMENT

A method and apparatus for reporting channel state information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the embodiments of the invention are discussed with respect to a wireless network compliant with a 3GPP Long Term Evolution (LTE), Long Term Evolution-Advanced (LTE-Advanced), or Evolved Universal Terrestrial Radio Access Network (E-UTRAN) architecture, it is recognized by one of ordinary skill in the art that the embodiments of the inventions have applicability to any type of packet based communication system and equivalent functional capabilities.

Figure 1:
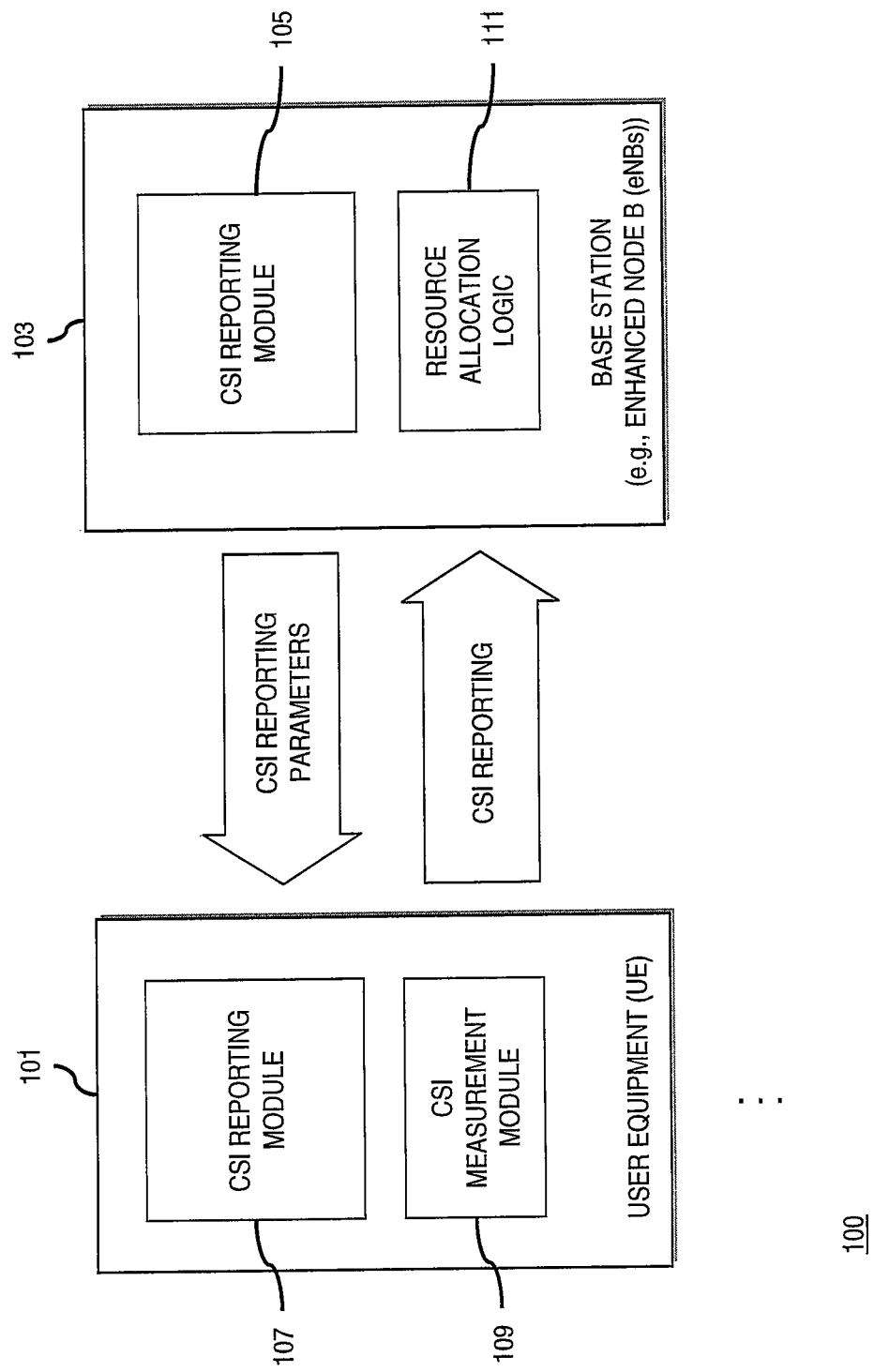
FIG. 1 is a diagram of a communication system capable of reporting channel state information, according to various exemplary embodiments of the invention.

FIG. 1 is a diagram of a communication system capable of reporting channel state information, according to various exemplary embodiments of the invention. As shown in FIG. 1, a communication system 100 (e.g., a wireless network) includes one or more user equipment (UEs) 101 that communicate with a base station 103, which is part of an access network (e.g., 3GPP LTE or E-UTRAN, etc.) (not shown). The UE 101 and the base station 103 permit the configuration and reporting of channel state information from the UE 101 to the base station 103 using CSI reporting parameters and a flag to trigger the reporting. As used herein, the term "CSI" includes channel quality information (CQI), pre-coding matrix indicator (PMI), rank indicator (RI), as well as quantized complex channel impulse or frequency response. It is contemplated that any other CSI or similar information may be reported using the approach described herein.

By way of example, under the 3GPP LTE architecture (as shown in FIGS. 7A-7D), the base station 103 denoted as an enhanced Node B (eNB). The UE 101 can be any type of mobile stations, such as handsets, terminals, stations, units, devices, multimedia tablets, Internet nodes, communicators, Personal Digital Assistants or any type of interface to the user (such as "wearable" circuitry, etc.). The UE 101 may be a fixed terminal, a mobile terminal, or a portable terminal. The system 100, according to one embodiment, operates using the Frequency Division Duplex (FDD) mode of 3GPP, as well as a Time Domain Duplexing (TDD) mode.

As part of a network planning scheme, the UE 101 and/or the eNB 103 utilize a discontinuous reception and/or transmission (DRX/DTX) mechanism, whereby channel state information (CSI) reporting is supported using, for instance, a CSI reporting module 105 in the eNB 103 and a CSI reporting module 107 in the UE 101. For example, within the UE 101, the CSI reporting module 107 interacts with a CSI measurement module 109 that is configured to determine radio transmission factors such as radio channel state, the speed of UE 101, etc. Specifically, the network planning process addresses the E-UTRAN Active state/Idle state DRX/DTX functionality and how to define an efficient and flexible DRX/DTX scheme.

To facilitate efficient link adaptation and radio channel aware packet scheduling at the eNB 103, the UE 101 transmits channel state information (e.g., in the form of CSI reports) to the base station 101. Under 3GPP architecture, CSI reports are sent in the uplink during time-periods in which the terminal is in an ACTIVE (or AWAKE) operational state. That is, CSI reports are not sent during time-periods where a terminal is in DRX SLEEP mode. To generate a CSI report, the UE 101 takes measurements of various parameters affecting channel state—e.g., the power of a pilot channel (also referred to as reference signal). In an exemplary embodiment, it is assumed that the UE 101 performs these measurements when the UE 101 is in an AWAKE mode. Correspondingly, when the UE 101 is not active due to DRX, there is no need to perform CSI measurements by the UE 101. Typically, the UE 101 is configured to perform periodic CSI reporting using, for instance, persistently allocated network resources on as a shared control channel (e.g., a physical uplink shared channel (PUSCH)).

Moreover, in 3GPP architecture, it is proposed that for each UE 101, there can be only one persistent allocation per link direction (e.g., uplink, downlink). Because periodic CSI reporting on, for example, the PUSCH can be seen as a persistent allocation, allocation of resources for uplink data transmissions may conflict for allocation of resources for periodic CSI reporting. As a result, under a traditional system, periodic CSI reporting is not based on a persistent allocation of resources (i.e., uses a separate resource allocation for each report), thereby requiring much more control signaling than when using persistently allocated resources for CSI reporting. To address this problem, the approach of system 100 provides a set of rules for configuration of periodic CSI reporting to allow for operation with persistent uplink data using a shared control channel (e.g., a physical uplink shared control channel (PUSCH)).

In exemplary embodiments, the UE 101 includes a transceiver and an antenna system (not shown) that couples to the transceiver to receive or transmit signals from the eNB 103; the antenna system can include one or more antennas. Similarly, the eNB 103 employs a transceiver (not shown) to exchange information with the UE 101 via one or more antennas, which transmit and receive electromagnetic signals. For instance, the eNB 103 may utilize a Multiple Input Multiple Output (MIMO) antenna system for supporting the parallel transmission of independent data streams to achieve high data rates with the UE 101. The eNB 103 may use orthogonal frequency divisional multiplexing (OFDM) as a downlink (DL) transmission scheme and a single-carrier transmission (e.g., single carrier-frequency division multiple access (SC-FDMA)) with cyclic prefix for the uplink (UL) transmission scheme. SC-FDMA can also be realized using a DFT-S-OFDM principle, which is detailed in 3GGP TR 25.814, entitle "Physical Layer Aspects for Evolved UTRA," v.1.5.0, May 2006 (which is incorporated herein by reference in its entirety). SC-FDMA, also referred to as Multi-User-SC-FDMA, allows multiple users to transmit simultaneously on different sub-bands.

Under a persistent or semi-persistent allocation scheme, the eNB 103 assigns network resources (e.g., resources relating to a communication link of the access network) to the UE 101, which then operates the assigned resources (e.g., channel) without explicit usage of the associated control channels. By way of example, the system 100 is described with respect to uplink persistent resource allocations within a 3GPP LTE architecture. In LTE, the eNB 103 controls allocation of the uplink resources using, for instance, a resource allocation logic 111.

Typically, the UE 101 and eNB 103 regularly exchange control information. Such control information, in an exemplary embodiment, is transported over a control channel on, for example, the downlink from the eNB 103 to the UE 101. By way of example, a number of communication channels are defined for use in the system 100. The channel types include: physical channels, transport channels, and logical channels. For instance in LTE system, the physical channels include, among others, a Physical Downlink Shared channel (PDSCH), Physical Downlink Control Channel (PDCCH), Physical Uplink Shared Channel (PUSCH), and Physical Uplink Control Channel (PUCCH). The transport channels can be defined by how they transfer data over the radio interface and the characteristics of the data. In LTE downlink, the transport channels include, among others, a broadcast channel (BCH), paging channel (PCH), and Down Link Shared Channel (DL-SCH). In LTE uplink, the exemplary transport channels are a Random Access Channel (RACH) and UpLink Shared Channel (UL-SCH). Each transport channel is mapped to one or more physical channels according to its physical characteristics.

Each logical channel can be defined by the type and required Quality of Service (QoS) of information that it carries. In LTE system, the associated logical channels include, for example, a broadcast control channel (BCCH), a paging control channel (PCCH), Dedicated Control Channel (DCCH), Common Control Channel (CCCH), Dedicated Traffic Channel (DTCH), etc.

In LTE system, the BCCH (Broadcast Control Channel) can be mapped onto both BCH and DL-SCH. As such, this is mapped to the PDSCH; the time-frequency resource can be dynamically allocated by using L1/L2 control channel (PDCCH). In this case, BCCH (Broadcast Control Channel)-RNTI (Radio Network Temporary Identifier) is used to identify the resource allocation information.

In exemplary embodiments, the eNB 103 grants uplink resource allocations based, at least in part, on channel state information that is reported by the UE 101. As mentioned, according to one embodiment, the system 100 is compliant with 3GPP LTE architecture, especially Layer 1 and Layer 2 specifications (36.2XX, 36.3XX)—which are incorporated herein by reference in their entireties. In 3GPP, three different CSI reporting schemes exist: (1) periodic CSI reporting on PUCCH, (2) aperiodic CSI on PUSCH, and (3) periodic CSI on PUSCH. The exemplary embodiments herein are described with respect to configuring periodic CSI reporting on the PUSCH.

Figure 2:
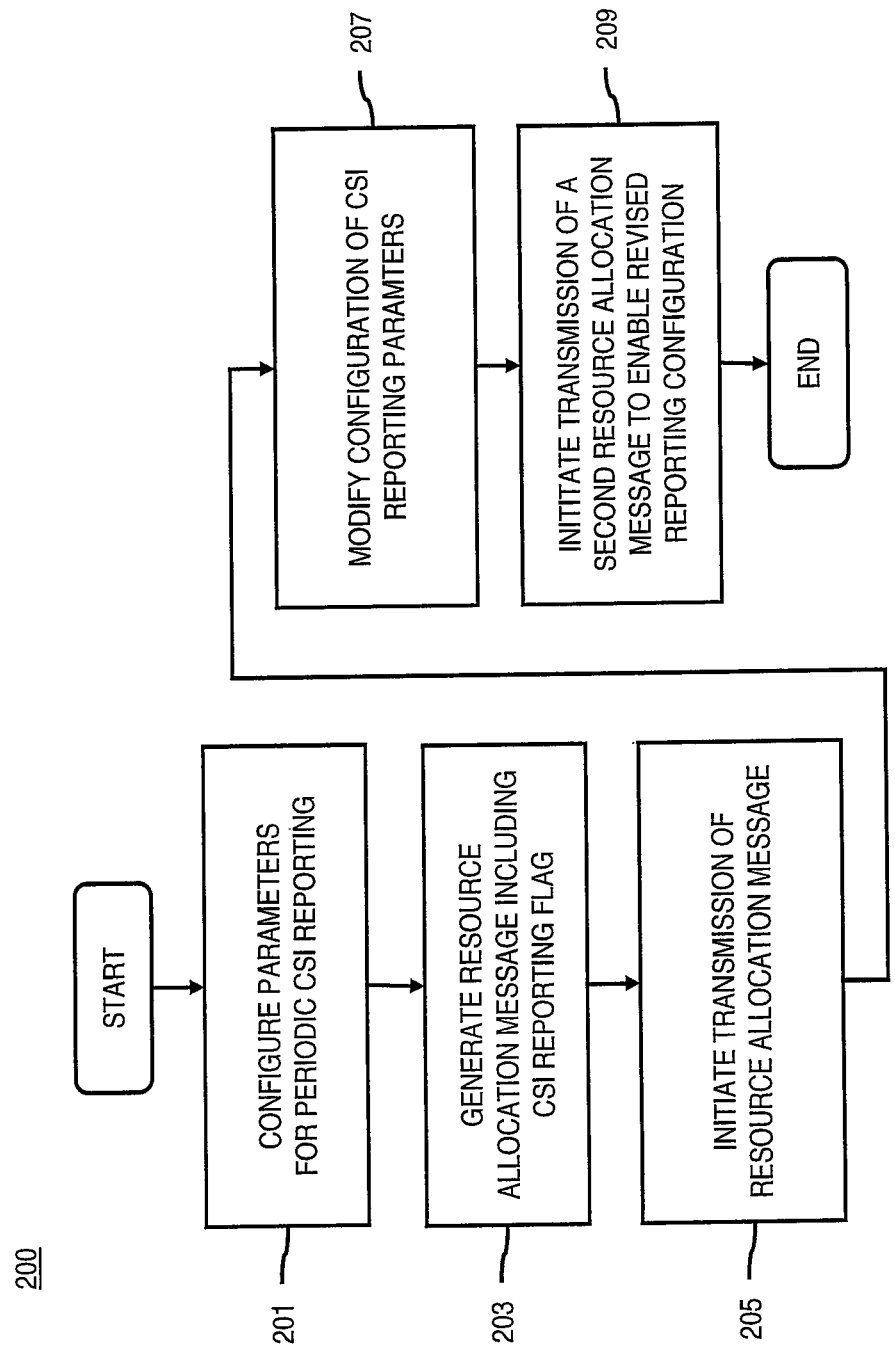
FIG. 2 is a flowchart of a process for configuring channel state information reporting, according to an exemplary embodiment.

FIG. 2 is a flowchart of a process for configuring channel state information reporting, according to an exemplary embodiment. In one embodiment, the process 200 is implemented in, for instance, a chip set including a processor and a memory as shown FIG. 9. In step 201, the eNB 103 configures one or more parameters relating to periodic reporting of channel state information by the UE 101. In exemplary embodiments, the periodic CSI reporting parameters include reporting periodicity (e.g., reporting CSI every 5th or 10th subframes of a radio transmission frame), subframe offset (e.g., offset 0, 1, 2, . . . 9 subframes from the first subframe of a radio transmission frame), CSI mode (e.g., best-M mode, i.e., UE 101 configured reporting; or eNB 103 configured reporting), or any combination thereof. The eNB 103 configures these parameters using, for example, higher layer signaling (radio resource control (RRC) or medium access control (MAC)).

Moreover, in exemplary embodiments, signaling of configuration information for the reporting parameters occurs separately from the CSI reporting trigger (i.e., the eNB 103 uses separate actions to configure the CSI reporting parameters and then to direct the UE 101 to report the channel state information). In exemplary embodiments, the CSI reporting trigger occurs as part of the resource allocation (e.g., persistent or semi-persistent resource allocation) process. Accordingly, the eNB 103 generates a resource allocation message (e.g., a grant of persistent network resources) that includes a flag (i.e., a CSI trigger) to enable or disable CSI reporting in a subframe configured for periodic reporting (step 203). For example, the resource allocation message is an uplink grant sent on the PDDCH, and includes information about (at least) the frequency resources to be used, the modulation and coding scheme/transport block size (MCS/TBS), cyclic shift for the demodulation reference signal (DM RS), and frequency hopping flag. It is contemplated that the CSI trigger is, for instance, a bit in the uplink resource grant in which a flag value of "1" or "on" indicates that the UE 101 should report CSI information and a flag value of "0" or "off" indicates that the UE 101 should not report CSI information. After generating the message, the eNB 103 initiates transmission of the resource allocation to the UE 101 (step 205).

In exemplary embodiments, periodic CSI on PUSCH uses persistent allocation of the uplink resources. That is, instead of sending an uplink grant on the PDCCH for each CSI transmission, the resource allocation is performed only once at the beginning of the transmission and the same allocation is followed in the later transmissions. Because the resource allocation is persistent, the UE 101 continues to transmit the CSI information as configured (e.g., periodicity of 5 ms) until directed otherwise. To modify the CSI reporting configuration, the eNB 103, for example, signals new configuration information for the CSI reporting parameters or removes the existing configuration information altogether (step 207). The eNB 103 then generates and transmits another resource allocation message that includes the CSI reporting flag to the UE 101 (step 209). The eNB 103 sets the flag to either enable or disable CSI reporting in a subframe configured for periodic reporting as desired. When there is no configuration information and the CSI trigger flag is set to "on", the UE 101 transmits, for instance, an aperiodic CSI report (e.g., a single CSI report) in response to receiving the CSI reporting trigger or flag. If the UE 101 received revised configuration information and the CSI trigger flag is set to "on", the UE 101 reports CSI information to the eNB 103 according to the revised configuration information.

Figure 3:
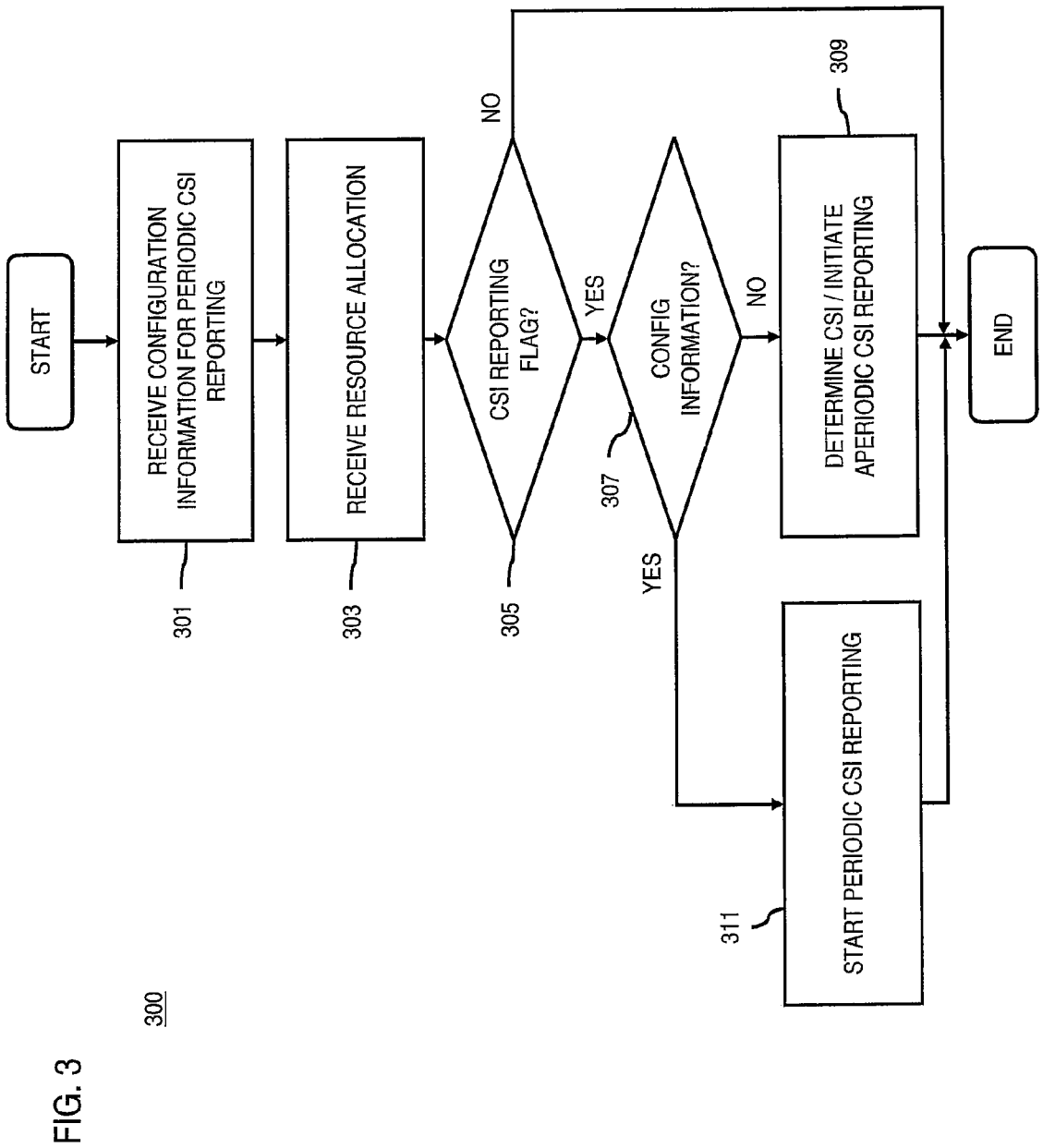
FIG. 3 is a flowchart of a process for reporting channel state information reporting, according to an exemplary embodiment.

FIG. 3 is a flowchart of a process for reporting channel state information reporting, according to an exemplary embodiment. In one embodiment, the process 200 is implemented in, for instance, a chip set including a processor and a memory as shown FIG. 9. In step 301, the UE 101 receives configuration information, from the eNB 103, for one or more parameters relating to periodic reporting of channel state information. As discussed with respect to FIG. 2, these parameters, for instance, include reporting periodicity, subframe offset, CSI mode, or any combination thereof. In addition, the UE 101 receives the parameters using higher layer signaling (e.g., RRC or MAC). In exemplary embodiments, the UE 101 is considered configured for periodic CSI reporting after receiving the configuration information. If the UE 101 does not receive or otherwise does not have the configuration information for periodic reporting, the UE 101 is considered to be configured for aperiodic reporting.

Next, the UE 101 receives a resource allocation from the eNB 103. On receipt of the allocation (step 303), the UE 101 determines whether the allocation contains a CSI reporting flag (step 305). For example, when the eNB 103 configures the resource allocation (e.g., an allocation for a persistent uplink resource), the eNB 103 can simultaneously request the UE 101 to initiate CSI reporting by including the CSI trigger flag in the allocation message. Table 1 summarizes the CSI reporting options available to the UE 101 based on its configuration of the periodic reporting parameters and the value of the CDQ trigger flag.

TABLE 1

|  | CSI Flag = On | CSI Flag = Off |
| --- | --- | --- |
| Periodic CSI Reporting Parameters Configured | Start periodic CSI reporting | No CSI reporting |
| Periodic CSI Reporting Parameters Not Configured | Send one aperiodic CSI report | No CSI reporting |

If the resource allocation does not contain a CSI reporting flag or the CSI flag bit is set to "off" or equivalent, the UE 101 does not report CSI information regardless of whether the UE 101 has received the configuration information related to periodic CSI reporting. If the resource allocation contains a CSI reporting flag with a value set to "on" or equivalent, the UE 101 then determines whether it has been configured for periodic CSI reporting (i.e., received configuration information for periodic CSI reporting) (step 307). If the UE 101 has not been configured for periodic CSI reporting, the UE 101 determines the CSI information (e.g., takes CSI measurements and generates a CSI report) and initiates transmission of a single aperiodic CSI report to the eNB 103. If the UE 101 is configured for periodic CSI reporting, the UE 101 starts periodic CSI reporting to the eNB 103 by periodically determining the CSI information and initiating transmission of the periodic CSI reports to the eNB 103 according to the configuration information.

In exemplary embodiments, the UE 101 transmits periodic CSI reports over, for instance, the PUSCH using the following rules: (1) the periodicity parameters for any simultaneous uplink data transmission override the periodicity parameters for the periodic CSI reporting, and (2) the UE 101 transmits periodic CSI reports only together (e.g., piggybacked) with the accompanying uplink data (e.g., no CSI reports are transmitted if there are no data transmissions). It is also contemplated that the system 100 may apply other alternate or additional rules for CSI reporting.

In addition, exemplary embodiments enable the eNB 103 to start, modify, or stop periodic CSI reporting in any subframe where the persistent data transmission is initialized or modified. For example, the UE 101 reconfigures the periodic CSI reporting parameters, generates a new resource allocation including the CSI trigger flag, and initiates transmission of the allocation to the UE 101.

Figure 4:
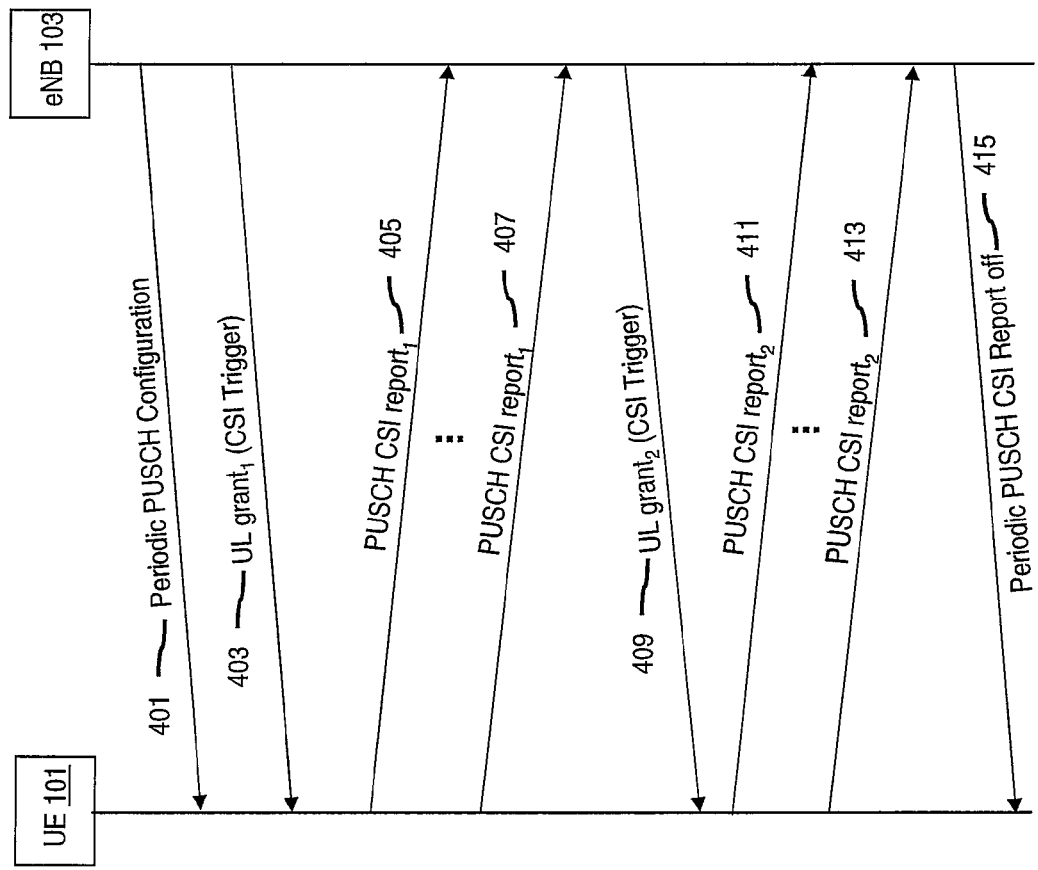
FIG. 4 is a time sequence diagram illustrating the process for reporting channel state information over a physical uplink shared channel (PUSCH), according to an exemplary embodiment.

FIG. 4 is a time sequence diagram illustrating the process for reporting channel state information over a physical uplink shared channel (PUSCH), according to an exemplary embodiment. In the diagram, a network process is illustrated by a thin vertical line. A message passed from one process to another is represented by horizontal arrows. The time sequence is indicated by the vertical position of the arrow as it meets the vertical lines representing the network processes. The processes represented in FIG. 4 are the UE 101 and the eNB 103. The process of FIG. 4 is also described with respect to FIG. 5, a diagram of a radio transmission frame for providing PUSCH channel state information, according to an exemplary embodiment.

In the example of FIG. 4, a mechanism for configuring periodic PUSCH CSI reporting is described. The procedure is as follows.

At 401, higher layer signaling, in an exemplary embodiment, is used to configure the parameters related to reporting format including: Reporting periodicity (e.g., every $5^{th}$ or $10^{th}$ subframe); Subframe offset (e.g. 0, 1, 2, ... 9); and CSI mode (best-M or eNode b configured feedback).

Figure 5:
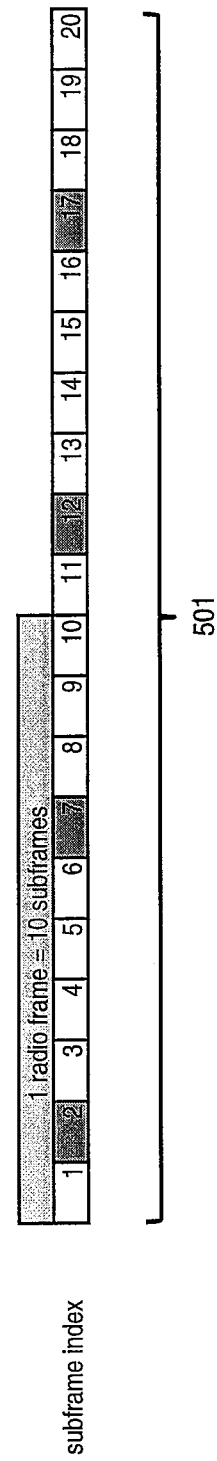
FIG. 5 is a diagram of a radio transmission frame for providing periodic PUSCH channel state information, according to an exemplary embodiment.

An example of the configuration is shown in the radio transmission frame 501 of FIG. 5. In the example, the reporting periodicity is set to 5 subframes and subframe offset to 1. Based on these parameters, the possible reporting opportunities are indicated by the shaded subframes (e.g., subframes 2, 7, 12, and 17).

In one embodiment, configuration of periodic PUSCH CSI reporting parameters does not necessarily result in the sending of the reports themselves. That is, the reporting needs to be enabled (e.g., switched on/off) separately.

Moreover, the reporting can be turned on by the eNB 103 by sending, per 403, an uplink (UL) grant with the CSI trigger flag set to "on." The UE 101 interprets the CSI trigger flag and configuration information according the process described with respect to FIG. 3.

The UL grant used for starting the reporting indicates the UL resources (e.g., the shaded subframes of FIG. 5) that are to be used for the reporting when the periodic PUSCH CSI reports are sent without simultaneous data transmission. In other words, the UE 101 transmits the periodic CSI reports, at 405 and 407, using the same physical resource blocks (PRBs) and link adaptation parameters as indicated by the UL grant that starts the transmission. In the subframes where the UE 101 sends simultaneously data and periodic PUSCH CSI reports, the UE 101 can utilize the resources and link adaptation parameters indicated in the corresponding UL grant.

The eNB 103 can modify (e.g., revise, start, stop) the CSI reporting by the UE 101 in the same way that the eNB 103 initiates the reporting: i.e., reconfigure or remove the periodic CSI reporting parameters, and initiate the transmission of another UL grant with the CSI trigger flag (at 409). In this manner, the new resource allocation and associated link adaptation parameters, etc. can override the previously used parameters. The UE 101 then uses the new parameters for subsequent CSI reporting (at 411-413).

Furthermore, the reporting can be switched off in several ways. One embodiment involves reconfiguration of the CSI parameters via higher layer signaling (e.g., Radio Resource Control (RRC) or Media Access Control (MAC)) to indicate that no periodic reporting is enabled by removing the configuration information for the periodic CSI reporting parameters. Alternatively, a rule can be defined whereby a value in the UL grant/combination of values corresponds to a command such as "periodic PUSCH CSI reporting off". Furthermore, if the CSI flag in the UL grant is always used to indicate the presence of CSI (see the error case handling process of FIG. 6, below), sending an UL grant with the CSI flag off is used to indicate explicitly that the UE 101 should no longer send CSI reports (at 415).

According to one embodiment, the aperiodic and periodic CSI reporting on PUSCH can be enhanced by using identical CSI modes (e.g., best-M or eNB 103 configured feedback) for these situations. This would allow the following rule to be defined: whenever a resource allocation is sent on the PDCCH, the CSI trigger bit in the UL grant indicates the presence of simultaneous PUSCH CSI (aperiodic or periodic).

The above process, according to certain embodiments, has several benefits. This approach is compatible with existing standards for persistent scheduling. Also, there is no need to define any new physical signals; existing mechanisms can simply be combined with some scheduling rules. Further, the process provides a capability to dynamically switch on/off and reconfigure the periodic PUSCH CSI allocation, thereby minimizing the UL overhead caused by excess reports or unnecessarily reserved resources.

FIG. 6 is a flowchart of an error handling process associated with channel state information reporting, according to an exemplary embodiment. In the event that the UE misses the UL grant in which the periodic CSI reporting on PUSCH is configured (on/off or new resources), an error condition can arise (step 601). If the UE sends a periodic CSI report without data (but has missed receiving the configuration information for the CSI reporting parameters) (step 603), the resource allocated persistently for the CSI is simply unused. The eNB 103 can detect the error condition using, for instance, a discontinuous transmission (DTX) detection mechanism (step 605), and attempt to switch the periodic PUSCH CSI reporting back on at a later point in time (e.g., via a repeat transmission of the UL grant) (step 607).

By way of example, if the UE sends a periodic report with data (but misses receiving the initial configuration for the CSI reporting parameters), additional errors can occur (step 609). Under such circumstances, UE 101 rate matching assumes that instead simultaneously sending both CSI reports and data, only data needs to be sent. This assumption, in turn, would result in an error at the reception end (e.g., at the eNB 103) (step 611). This potential error case can be avoided, according to one embodiment, by using the CSI trigger bit in the UL grant to indicate the presence of simultaneous PUSCH CSI.

FIGS. 7A-7D are diagrams of communication systems having exemplary LTE architectures, in which the system 100 of FIG. 1 can operate, according to various exemplary embodiments of the invention. By way of example (as discussed with respect to FIG. 2), the base stations 103 and the UEs 101 can communicate in system 700 using any access scheme, such as Time Division Multiple Access (TDMA), Code Division Multiple Access (CDMA), Wideband Code Division Multiple Access (WCDMA), Orthogonal Frequency Division Multiple Access (OFDMA) or Single Carrier Frequency Division Multiple Access (SC-FDMA) or a combination thereof. In an exemplary embodiment, both uplink and downlink can utilize WCDMA. In another exemplary embodiment, uplink utilizes SC-FDMA, while downlink utilizes OFDMA.

Figure 7A:
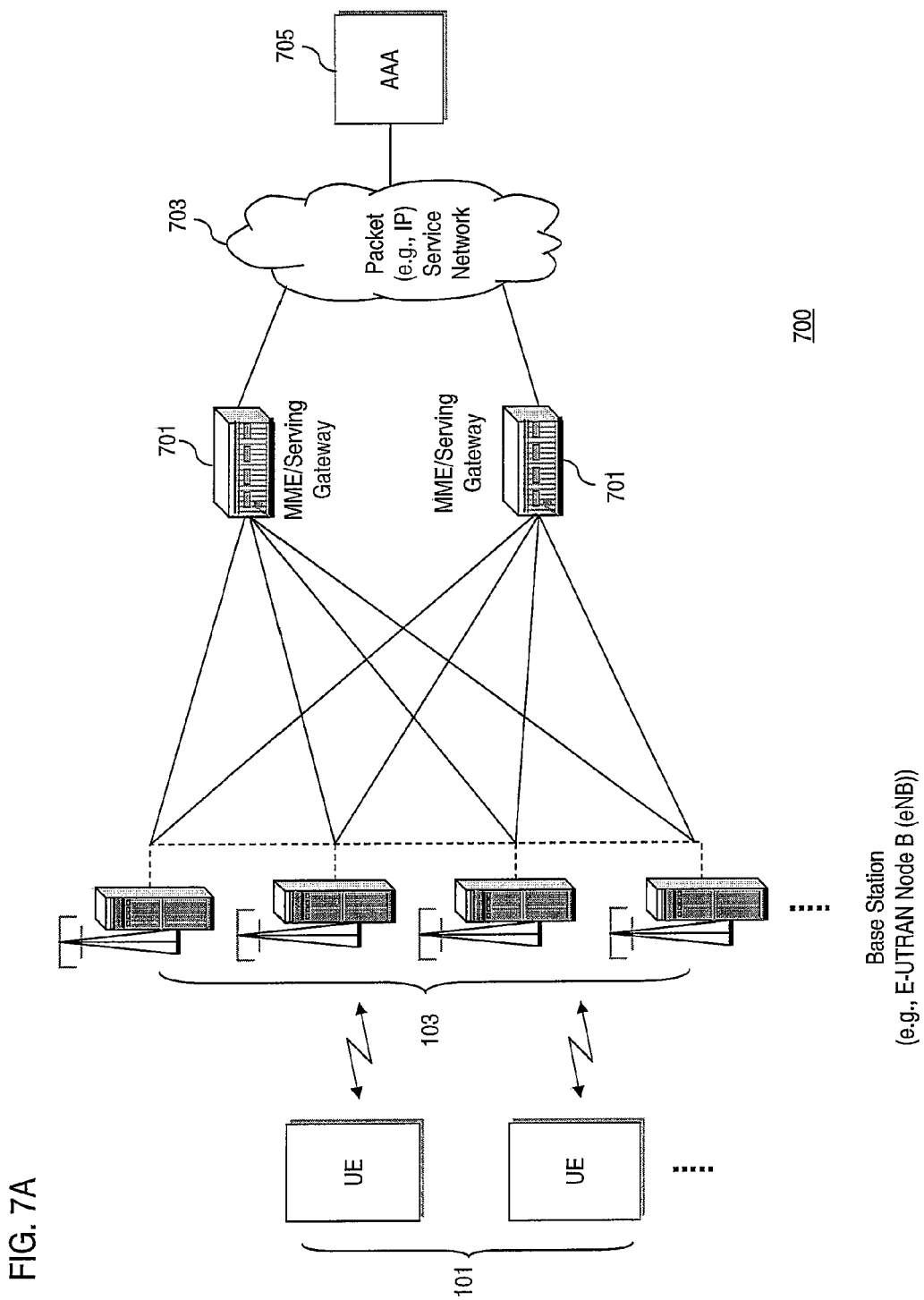
FIGS. 7A-7D are diagrams of communication systems having exemplary long-term evolution (LTE) architectures, in which the system of FIG. 1 can operate, according to various exemplary embodiments of the invention.

The communication system 700 is compliant with 3GPP LTE, entitled "Long Term Evolution of the 3GPP Radio Technology" (which is incorporated herein by reference in its entirety). As shown in FIG. 7A, one or more user equipment (UEs) 101 communicate with a network equipment, such as a base station 103, which is part of an access network (e.g., WiMAX (Worldwide Interoperability for Microwave Access), 3GPP LTE (or E-UTRAN), etc.). Under the 3GPP LTE architecture, base station 103 is denoted as an enhanced Node B (eNB).

The MME (Mobile Management Entity)/Serving Gateways 701 are connected to the eNBs 103 in a full or partial mesh configuration using tunneling over a packet transport network (e.g., Internet Protocol (IP) network) 703. Exemplary functions of the MME/Serving GW 701 include distribution of paging messages to the eNBs 103, IP header compression, termination of U-plane packets for paging reasons, and switching of U-plane for support of UE mobility. Since the GWs 701 serve as a gateway to external networks, e.g., the Internet or private networks 703, the GWs 701 include an Access, Authorization and Accounting system (AAA) 705 to securely determine the identity and privileges of a user and to track each user's activities. Namely, the MME Serving Gateway 701 is the key control-node for the LTE access-network and is responsible for idle mode UE tracking and paging procedure including retransmissions. Also, the MME 701 is involved in the bearer activation/deactivation process and is responsible for selecting the SGW (Serving Gateway) for a UE at the initial attach and at time of intra-LTE handover involving Core Network (CN) node relocation.

A more detailed description of the LTE interface is provided in 3GPP TR 25.813, entitled "E-UTRA and E-UTRAN: Radio Interface Protocol Aspects," which is incorporated herein by reference in its entirety.

Figure 7B:
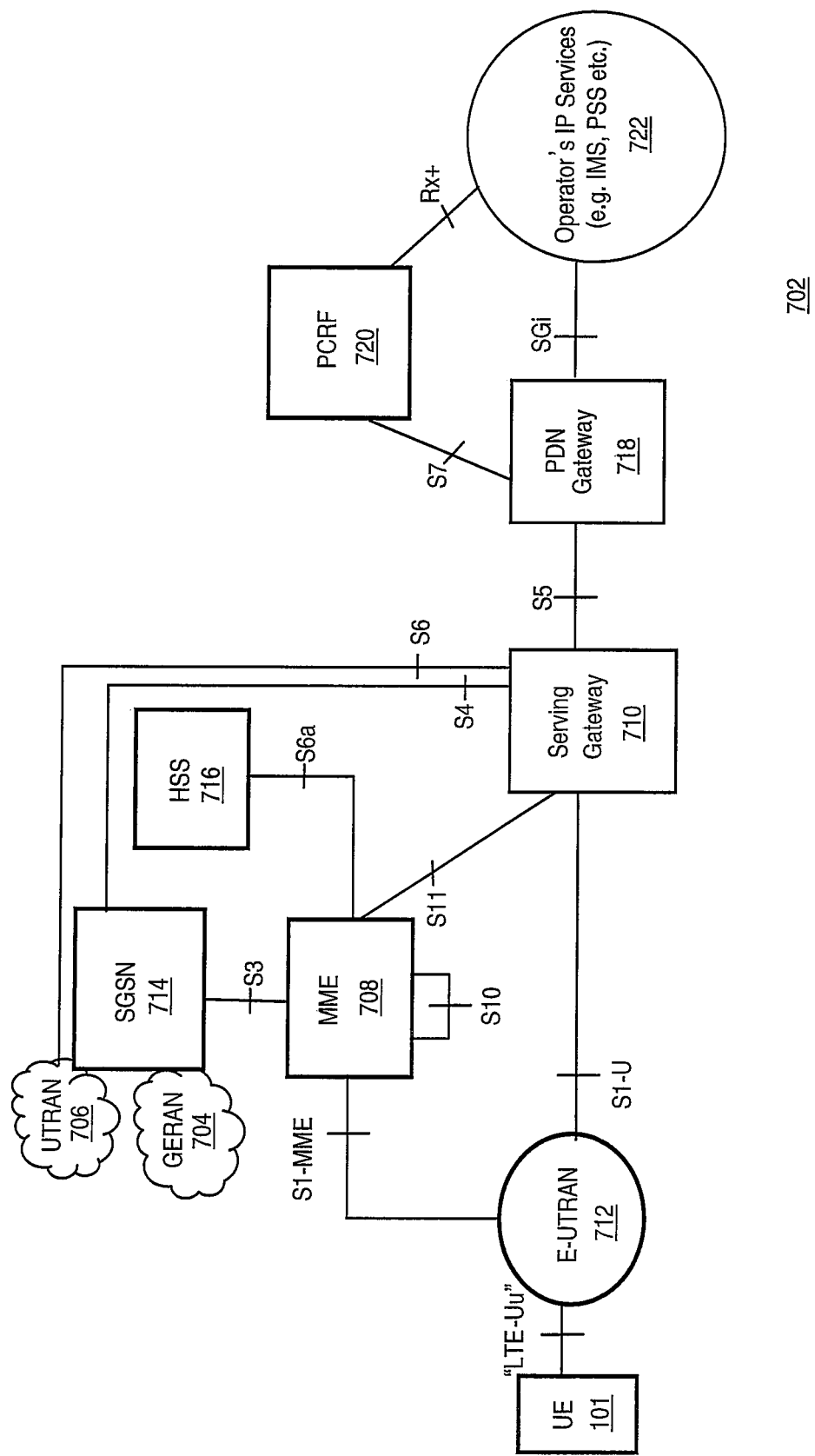

In FIG. 7B, a communication system 702 supports GERAN (GSM/EDGE radio access) 704, and UTRAN 706 based access networks, E-UTRAN 712 and non-3GPP (not shown) based access networks, and is more fully described in TR 23.882, which is incorporated herein by reference in its entirety. A key feature of this system is the separation of the network entity that performs control-plane functionality (MME 708) from the network entity that performs bearer-plane functionality (Serving Gateway 710) with a well defined open interface between them S11. Since E-UTRAN 712 provides higher bandwidths to enable new services as well as to improve existing ones, separation of MME 708 from Serving Gateway 710 implies that Serving Gateway 710 can be based on a platform optimized for signaling transactions. This scheme enables selection of more cost-effective platforms for, as well as independent scaling of, each of these two elements. Service providers can also select optimized topological locations of Serving Gateways 710 within the network independent of the locations of MMEs 708 in order to reduce optimized bandwidth latencies and avoid concentrated points of failure.

As seen in FIG. 7B, the E-UTRAN (e.g., eNB) 712 interfaces with UE via LTE-Uu. The E-UTRAN 712 supports LTE air interface and includes functions for radio resource control (RRC) functionality corresponding to the control plane MME 708. The E-UTRAN 712 also performs a variety of functions including radio resource management, admission control, scheduling, enforcement of negotiated uplink (UL) QoS (Quality of Service), cell information broadcast, ciphering/ deciphering of user, compression/decompression of downlink and uplink user plane packet headers and Packet Data Convergence Protocol (PDCP).

The MME 708, as a key control node, is responsible for managing mobility UE identifies and security parameters and paging procedure including retransmissions. The MME 708 is involved in the bearer activation/deactivation process and is also responsible for choosing Serving Gateway 710 for the UE 101. MME 708 functions include Non Access Stratum (NAS) signaling and related security. MME 708 checks the authorization of the UE 101 to camp on the service provider's Public Land Mobile Network (PLMN) and enforces UE 101 roaming restrictions. The MME 708 also provides the control plane function for mobility between LTE and 2G/3G access networks with the S3 interface terminating at the MME 708 from the SGSN (Serving GPRS Support Node) 714.

The SGSN 714 is responsible for the delivery of data packets from and to the mobile stations within its geographical service area. Its tasks include packet routing and transfer, mobility management, logical link management, and authentication and charging functions. The S6a interface enables transfer of subscription and authentication data for authenticating/authorizing user access to the evolved system (AAA interface) between MME 708 and HSS (Home Subscriber Server) 716. The S10 interface between MMEs 708 provides MME relocation and MME 708 to MME 708 information transfer. The Serving Gateway 710 is the node that terminates the interface towards the E-UTRAN 712 via S1-U.

The S1-U interface provides a per bearer user plane tunneling between the E-UTRAN 712 and Serving Gateway 710. It contains support for path switching during handover between eNBs 712. The S4 interface provides the user plane with related control and mobility support between SGSN 714 and the 3GPP Anchor function of Serving Gateway 710.

The S6 is an interface between UTRAN 706 and Serving Gateway 710. Packet Data Network (PDN) Gateway 718 provides connectivity to the UE to external packet data networks by being the point of exit and entry of traffic for the UE. The PDN Gateway 718 performs policy enforcement, packet filtering for each user, charging support, lawful interception and packet screening. Another role of the PDN Gateway 718 is to act as the anchor for mobility between 3GPP and non-3GPP technologies such as WiMAX and 3GPP2 (CDMA 1X and EvDO (Evolution Data Only)).

The S7 interface provides transfer of QoS policy and charging rules from PCRF (Policy and Charging Role Function) 720 to Policy and Charging Enforcement Function (PCEF) in the PDN Gateway 718. The SGi interface is the interface between the PDN Gateway and the operator's IP services including packet data network 722. Packet data network 722 may be an operator external public or private packet data network or an intra operator packet data network, e.g., for provision of IMS (IP Multimedia Subsystem) services. Rx+ is the interface between the PCRF and the packet data network 722.

Figure 7C:
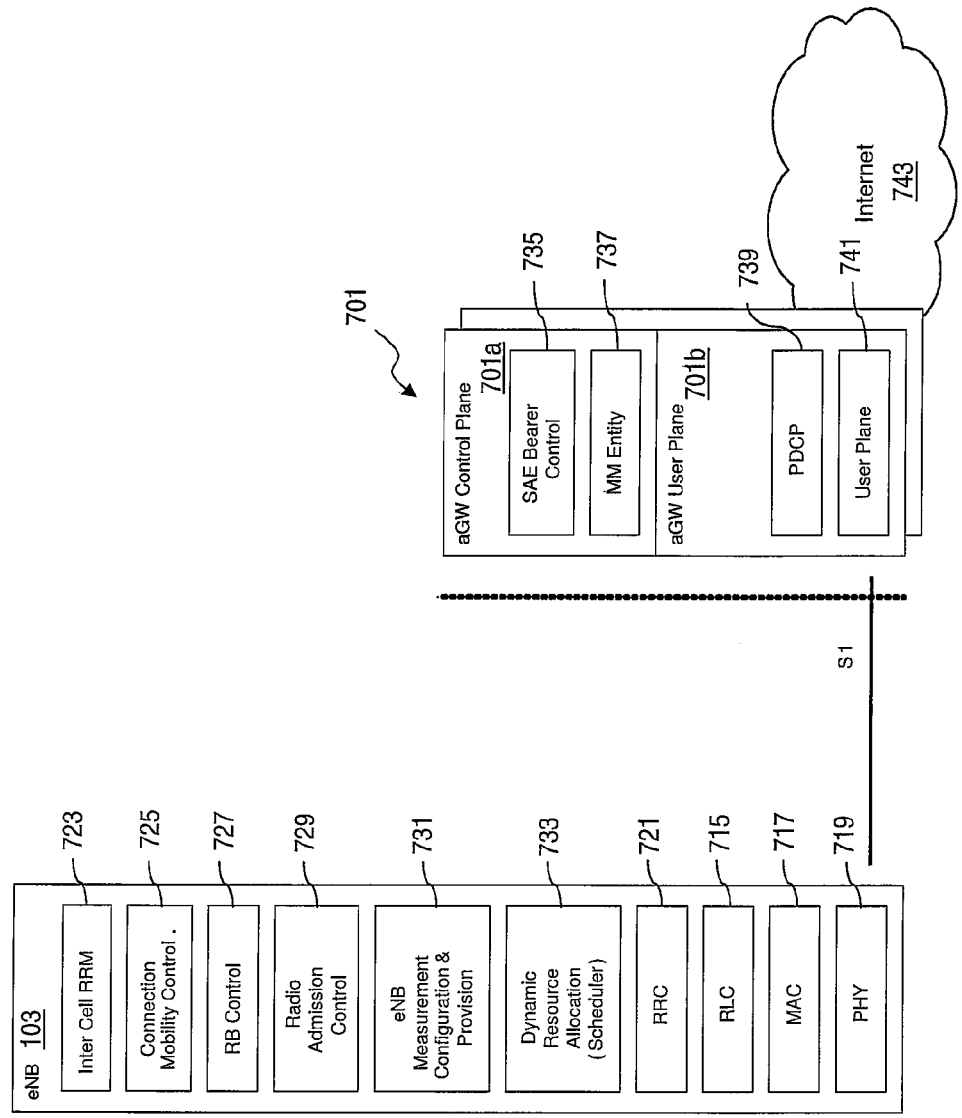

As seen in FIG. 7C, the eNB utilizes an E-UTRA (Evolved Universal Terrestrial Radio Access) (user plane, e.g., RLC (Radio Link Control) 715, MAC (Media Access Control) 717, and PHY (Physical) 719, as well as a control plane (e.g., RRC 721)). The eNB also includes the following functions: Inter Cell RRM (Radio Resource Management) 723, Connection Mobility Control 725, RB (Radio Bearer) Control 727, Radio Admission Control 729, eNB Measurement Configuration and Provision 731, and Dynamic Resource Allocation (Scheduler) 733.

The eNB communicates with the aGW 701 (Access Gateway) via an Si interface. The aGW 701 includes a Control Plane 701a and a User plane 701b. The control plane 701a provides the following components: SAE (System Architecture Evolution) Bearer Control 735 and MM (Mobile Management) Entity 737. The user plane 701b includes a PDCP (Packet Data Convergence Protocol) 739 and a user plane functions 741. It is noted that the functionality of the aGW 701 can also be provided by a combination of a serving gateway (SGW) and a packet data network (PDN) GW. The aGW 701 can also interface with a packet network, such as the Internet 743.

Figure 7D:
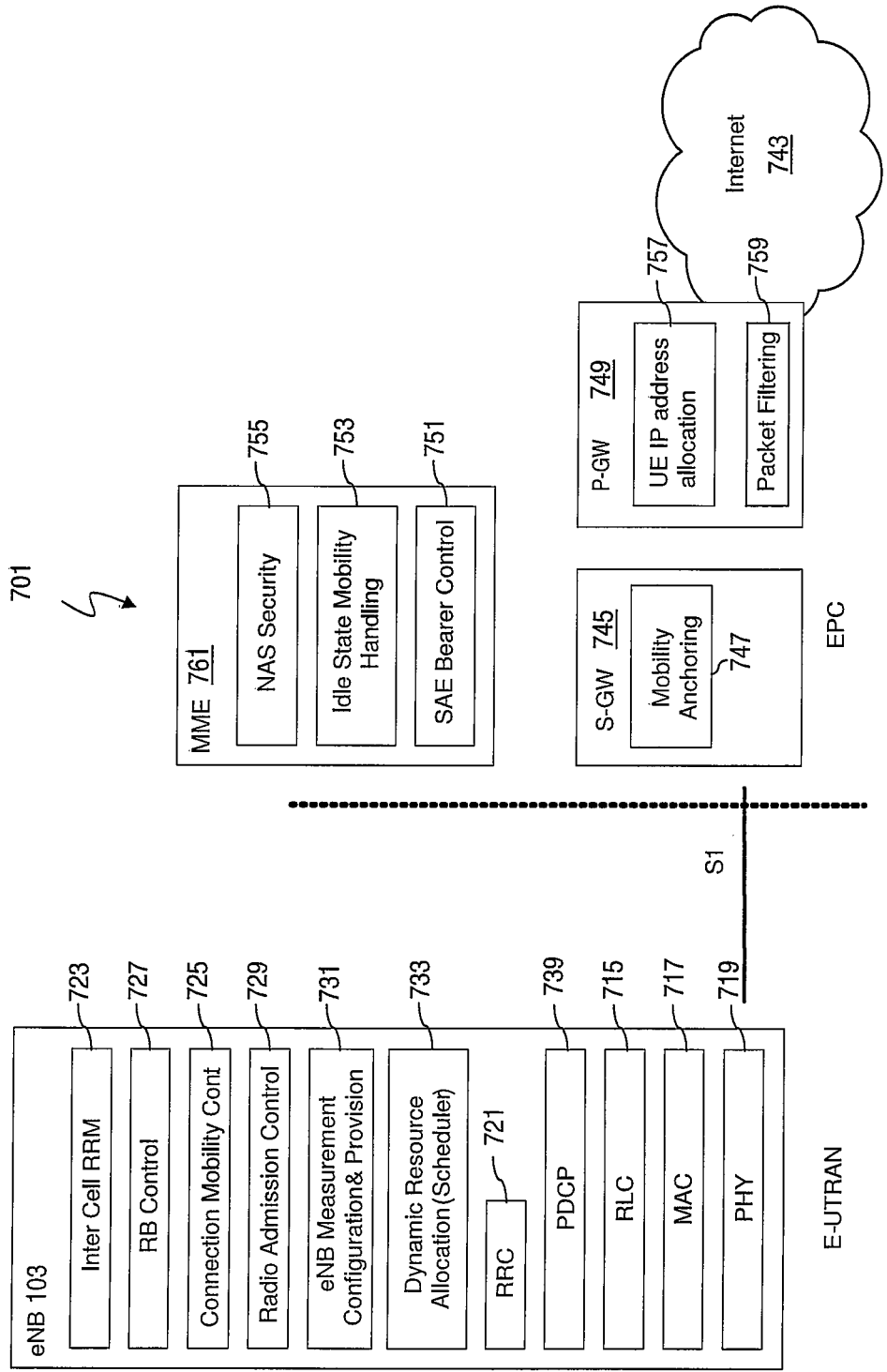

In an alternative embodiment, as shown in FIG. 7D, the PDCP (Packet Data Convergence Protocol) functionality can reside in the eNB rather than the GW 701. Other than this PDCP capability, the eNB functions of FIG. 7C are also provided in this architecture.

In the system of FIG. 7D, a functional split between E-UTRAN and EPC (Evolved Packet Core) is provided. In this example, radio protocol architecture of E-UTRAN is provided for the user plane and the control plane. A more detailed description of the architecture is provided in 3GPP TS 36.300.

The eNB 103 interfaces via the S1 to the Serving Gateway 745, which includes a Mobility Anchoring function 747. According to this architecture, the MME (Mobility Management Entity) 761 provides SAE (System Architecture Evolution) Bearer Control 751, Idle State Mobility Handling 753, and NAS (Non-Access Stratum) Security 755. The MME 761 is connected to the Internet 743 via a Packet Data Network Gateway (P-GW) 749, which provides UE IP address allocation 757 and packet filtering 759.

One of ordinary skill in the art would recognize that the processes for reporting channel state information may be implemented via software, hardware (e.g., general processor, Digital Signal Processing (DSP) chip, an Application Specific Integrated Circuit (ASIC), Field Programmable Gate Arrays (FPGAs), etc.), firmware, or a combination thereof. Such exemplary hardware for performing the described functions is detailed below with respect to FIG. 8.

Figure 8:
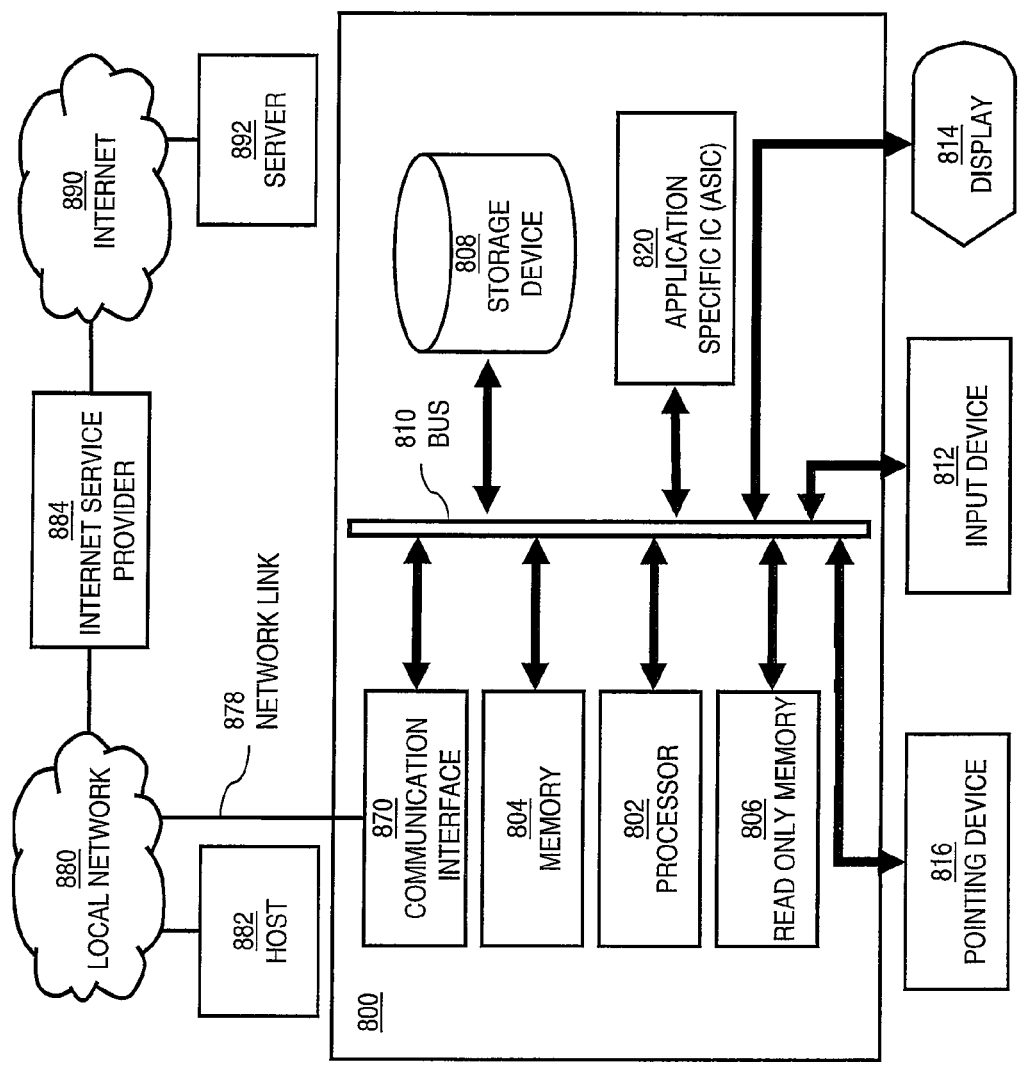
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
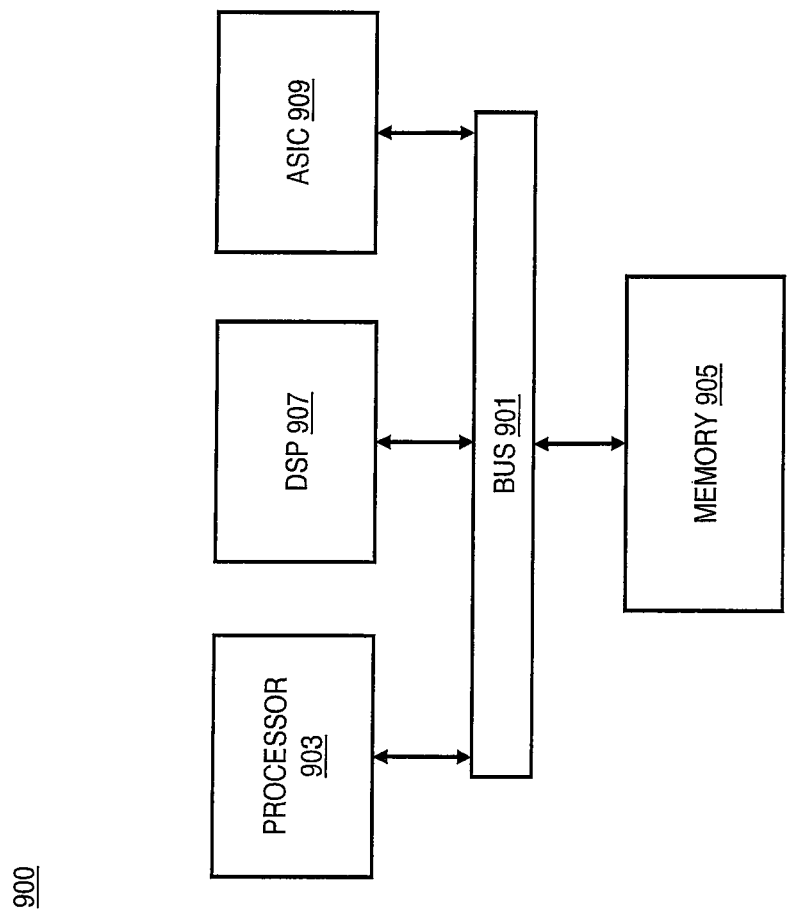
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
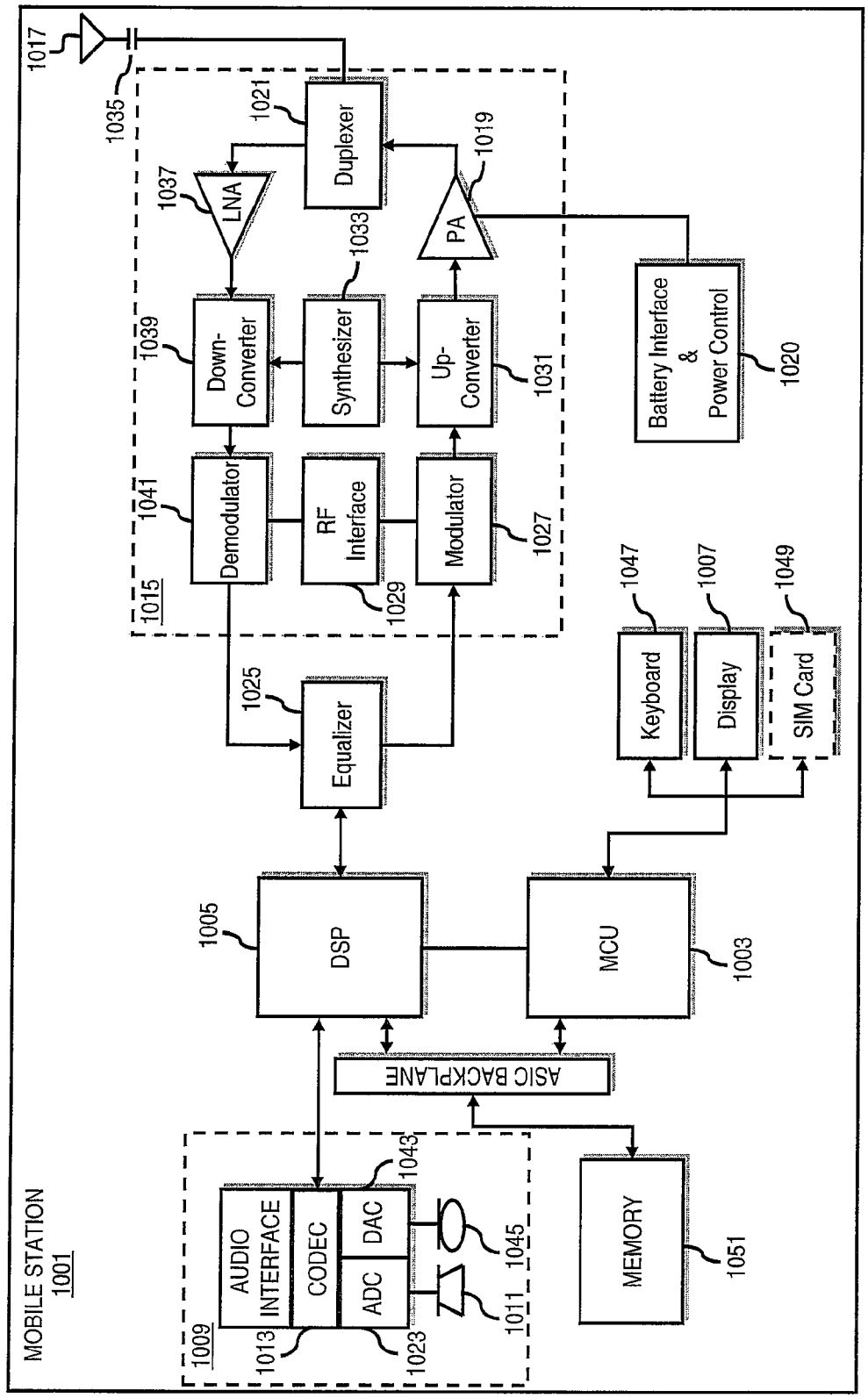
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method, comprising:
    configuring one or more parameters, including reporting periodicity, subframe offset and channel state information mode, relating to periodic reporting of channel state information by a user equipment;
    generating a resource allocation message including a flag to enable or disable the reporting of the channel state information in a subframe configured for periodic reporting or aperiodic reporting; and
    initiating transmission of the resource allocation message to the user equipment, wherein configuration information for the one or more parameters is transmitted using a higher layer signaling protocol including radio resource control.

2. The method of claim 1, wherein the one or more parameters include reporting mode; and wherein the configuration information for the one or more parameters is transmitted using a higher layer signaling protocol including medium access control.

3. The method of claim 2, wherein lack of the configuration information for the one or more parameters configures the user equipment for aperiodic reporting of the channel state information.

4. The method of claim 1, wherein presence of the flag to enable the reporting of channel state information in the resource allocation message indicates presence of the channel state information in a data transmission using resources specified in the resource allocation message.

5. The method of claim 1, further comprising:
    modifying or removing the configuration information for the one or more parameters;
    generating a second resource allocation message including a flag to enable or disable the reporting of the channel state information in a subframe configured for periodic reporting; and
    initiating transmission of the second resource allocation message to the user equipment.

6. An apparatus comprising a processor and a memory storing executable instructions that if executed cause the apparatus to at least perform the following:
    configuring one or more parameters, including reporting periodicity, subframe offset and channel state information mode, relating to periodic reporting of channel state information by a user equipment;
    generating a resource allocation message including a flag to enable or disable the reporting of the channel state information in a subframe configured for periodic reporting or aperiodic reporting; and
    initiating transmission of the resource allocation message to the user equipment, wherein configuration information for the one or more parameters is transmitted using a higher layer signaling protocol including radio resource control.

7. An apparatus according to claim 6, wherein the processor and the memory are caused to further perform the following:
    modifying or removing the configuration information for the one or more parameters;
    generating a second resource allocation message including a flag to enable or disable the reporting of the channel state information in a subframe configured for periodic reporting; and
    initiating transmission of the second resource allocation message to the user equipment.

8. An apparatus according to claim 6, wherein the apparatus is part of a system further comprising:
    a base station configured to allocate resources to the user equipment and receive channel state information.

9. A method, comprising:
    receiving configuration information, from a base station, for one or more parameters, including reporting periodicity, subframe offset and channel state information mode, relating to periodic reporting of channel state information;
    receiving a resource allocation message including a flag to enable or disable the reporting of the channel state information in a subframe configured for periodic reporting or aperiodic reporting;
    determining the channel state information according to the configuration information; and
    initiating reporting of the channel state information to the base station according to the flag, wherein configuration information for the one or more parameters is received via a higher layer signaling protocol including radio resource control.

10. The method of claim 9, wherein the one or more parameters include reporting mode; and wherein the configuration information for the one or more parameters is received via a higher layer signaling protocol including medium access control.

11. The method of claim 9, wherein lack of the configuration information for the one or more parameters indicates aperiodic reporting of the channel state information.

12. The method of claim 9, wherein the channel state information is reported in a data transmission using resources specified in the resource allocation message.

13. The method of claim 9, further comprising:
    receiving revised configuration information for the one or more parameters;
    receiving a second resource allocation message including a flag to enable or disable the reporting of the channel state information in a subframe configured for periodic reporting;
    determining the channel state information according to the revised configuration information; and
    initiating reporting of the channel state information to the base station according to the flag in the second resource allocation message.

14. An apparatus comprising a processor and a memory storing executable instructions that if executed cause the apparatus to at least perform the following:

receiving configuration information, from a base station, for one or more parameters, including reporting periodicity, subframe offset and channel state information mode, relating to periodic reporting of channel state information;

receiving a resource allocation message including a flag to enable or disable the reporting of the channel state information in a subframe configured for periodic reporting or aperiodic reporting;

determining the channel state information according to the configuration information; and initiating reporting of the channel state information to the base station according to the flag, wherein configuration information for the one or more parameters is received via a higher layer signaling protocol including radio resource control.

15. The apparatus of claim 14, wherein the processor and the memory are caused to further perform the following:

receiving revised configuration information for the one or more parameters;

receiving a second resource allocation message including a flag to enable or disable the reporting of the channel state information in a subframe configured for periodic reporting;

determining the channel state information according to the revised configuration information; and initiating reporting of the channel state information to the base station according to the flag in the second resource allocation message.

16. The apparatus of claim 14, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

17. An apparatus comprising:

means for receiving configuration information, from a base station, for one or more parameters, including reporting periodicity, subframe offset and channel state information mode, relating to periodic reporting of channel state information;

means for receiving a resource allocation message including a flag to enable or disable the reporting of the channel state information in a subframe configured for periodic reporting or aperiodic reporting;

means for determining the channel state information according to the configuration information; and means for initiating reporting of the channel state information to the base station according to the flag, wherein configuration information for the one or more parameters is received via a higher layer signaling protocol including radio resource control.

18. An apparatus according to claim 17, further comprising:

means for receiving revised configuration information for the one or more parameters;

means for receiving a second resource allocation message including a flag to enable or disable the reporting of the channel state information in a subframe configured for periodic reporting;

means for determining the channel state information according to the revised configuration information; and means for initiating reporting of the channel state information to the base station according to the flag in the second resource allocation message.

* * * * *